US008519025B2

(12) United States Patent
Teshima et al.

(10) Patent No.: US 8,519,025 B2
(45) Date of Patent: Aug. 27, 2013

(54) METHOD FOR MANUFACTURING DISPERSION AND LIQUID MIXING DEVICE

(75) Inventors: Takayuki Teshima, Yokohama (JP); Tetsuo Hino, Yamato (JP); Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 12/488,587

(22) Filed: Jun. 22, 2009

(65) Prior Publication Data

US 2009/0318586 A1 Dec. 24, 2009

(30) Foreign Application Priority Data

Jun. 24, 2008 (JP) ................................. 2008-165078
Oct. 29, 2008 (JP) ................................. 2008-278426

(51) Int. Cl.
*C09B 67/00* (2006.01)
*B01F 1/00* (2006.01)

(52) U.S. Cl.
USPC ........... 523/318; 523/315; 523/333; 422/211; 422/220; 347/40

(58) Field of Classification Search
USPC ................. 523/315, 318, 333; 422/211, 220; 347/40, 43
See application file for complete search history.

(56) References Cited

U.S. PATENT DOCUMENTS

| | | | | |
|---|---|---|---|---|
| 7,557,150 | B2 * | 7/2009 | Teshima et al. | 523/315 |
| 7,625,066 | B2 * | 12/2009 | Teshima et al. | 347/43 |
| 2002/0040665 | A1 | 4/2002 | Dietz et al. | |
| 2007/0149651 | A1 * | 6/2007 | Teshima et al. | 523/315 |
| 2008/0309708 | A1 * | 12/2008 | Teshima et al. | 347/40 |

* cited by examiner

*Primary Examiner* — Hannah Pak
(74) *Attorney, Agent, or Firm* — Canon U.S.A., Inc., IP Division

(57) ABSTRACT

In a method for manufacturing a dispersion which includes a dispersion medium and particles dispersed therein, the method includes bringing at least two types of liquids into contact with each other to form a reaction product comprising the particles, wherein the liquids are ejected from respective nozzles to be brought into contact with each other and then to flow in an integrated manner while forming a spiral flow.

8 Claims, 10 Drawing Sheets

METHOD FOR MANUFACTURING DISPERSION AND LIQUID MIXING DEVICE

BACKGROUND OF THE INVENTION

1. Field of the Invention

The present invention relates to a method for manufacturing a dispersion and a liquid mixing device.

2. Description of the Related Art

As functional materials included in dispersions, for example, there have been known agricultural chemicals, such as an herbicide and a pesticide, medicine, such as an anticancer agent, an antiallergic agent, and an antiphlogistic, and coloring materials contained, for example, in ink, toner, and color filters.

In addition, as the coloring materials contained in ink, toner, and the like, pigments have started to be used. In these situations, in order to obtain a superior pigment dispersion using a pigment, a pigment dispersing method using a microjet reactor has been proposed.

In US 2002/0040665 A1, a method for forming a suspension liquid of a pigment has been disclosed in which a solution containing a solvent and a crude pigment dissolved therein, and a precipitation medium, are sprayed and are allowed to collide with each other in a housing of a reactor chamber.

In addition, in US 2007/0149651 A1, a method for manufacturing a dispersion has been disclosed which includes a step of generating a reaction product by reaction between two types of liquids so as to form a dispersion including the reaction product dispersed in a dispersion medium.

In particular, in US 2007/0149651 A1, the two types of liquids are ejected from respective nozzles which are separately provided so that traveling directions of the liquids thus ejected intersect each other at an angle of 120° or less, and so that these liquids then flow in an integrated manner. Accordingly, a method for manufacturing a dispersion in which the reaction product is generated is disclosed.

In US 2002/0040665 A1, since the solution containing the pigment and the precipitation medium are sprayed frontally from respective nozzles facing each other and are mixed together, a liquid is splashed in the housing of the chamber.

In the case described above, it is supposed that the splashed liquid and/or reaction product adheres and deposits on an inside wall of the housing and then separates and peels off therefrom as the time passes.

In addition, the liquid or reaction product that separates and peels off may unfavorably cause a secondary reaction with liquids which are newly sprayed from the nozzles.

The disclosure of US 2007/0149651 A1 may be applied to the process of US 2002/0040665 A1, and discloses that since the splash of the liquid is suppressed, the secondary reaction caused thereby can be prevented, and a dispersion can be stably manufactured for a relatively long period of time.

Although the method described in US 2007/0149651 A1 is a contribution to this technical field, the technique described can still be improved. For example, according to the method disclosed in US 2007/0149651 A1, a dispersion including a reaction product having a relatively small particle diameter can be obtained; however, variation in the particle diameters still exists.

SUMMARY OF THE INVENTION

According to one aspect of the invention, a method for manufacturing a dispersion which includes a dispersion medium and particles dispersed therein is provided. The method includes bringing at least two types of liquids into contact with each other to form a reaction product comprising the particles, wherein the liquids are ejected from respective nozzles to be brought into contact with each other and then to flow in an integrated manner while forming a spiral flow.

Further features of the present invention will become apparent from the following description of exemplary embodiments with reference to the attached drawings.

DESCRIPTION OF THE EMBODIMENTS

In one embodiment of the invention, a method for manufacturing a pigment dispersion comprises a method for manufacturing a dispersion having a dispersion medium and particles dispersed therein. The method includes bringing at least two types of liquids into contact with each other to form a reaction product comprising the particles, with the particles being formed of the reaction product. In addition, after nozzles are disposed so that liquids ejected therefrom are brought into contact with each other and are then allowed to flow in an integrated manner while forming a spiral flow, the liquids are ejected from the nozzles.

According to one aspect of the present invention, a spiral flow indicates a flow in which a plurality of liquids move in an axial direction by circular movement around a shared axis while being intertwined with each other.

Since a plurality of liquids circulate around the axis while being intertwined with each other, the flows of the liquids have improved stability, and more uniform mixing and reaction between the liquids can be achieved. As a result, a pigment dispersion having particles with a relatively small diameter and a narrow particle distribution can be obtained.

Aspects of the present invention include a method in which, after nozzles are disposed so that traveling directions of the liquids intersect each other in a free space, and so that after being brought into contact with each other in a free space the liquids flow in an integrated manner while forming a spiral flow, the liquids are ejected from the nozzles.

Aspects of the present invention also include a method in which the nozzles are disposed so that the liquids ejected therefrom are brought into contact with each other while the centers of the axes of the ejected liquids in the traveling directions deviate from each other.

Aspects if the present invention also include a method in which the nozzles are disposed so that, in a cross-section which is perpendicular to a liquid-contact surface between one liquid A of two types of liquids and another liquid B of the two types of liquids, and is perpendicular to a traveling direction of an integrated liquid formed of the liquids A and B, a gravity center Ga of the liquid A and a gravity center Gb of the liquid B deviate with respect to the identical normal line to the liquid-contact surface.

In addition, according to one aspect of the present invention, one liquid of the two types of liquids may be a solution that is capable of dissolving a pigment, and the other liquid may be a solution that is capable of decreasing the solubility of the pigment. In addition, one liquid of the two types of liquids may be a solution comprising a coupler, and the other liquid may be a solution comprising a diazonium salt.

Furthermore, at least one liquid of the two types of liquids may comprise a dispersing agent.

Hereinafter, with reference to the drawings, aspects of the present invention will be described in detail.

Figure 1:
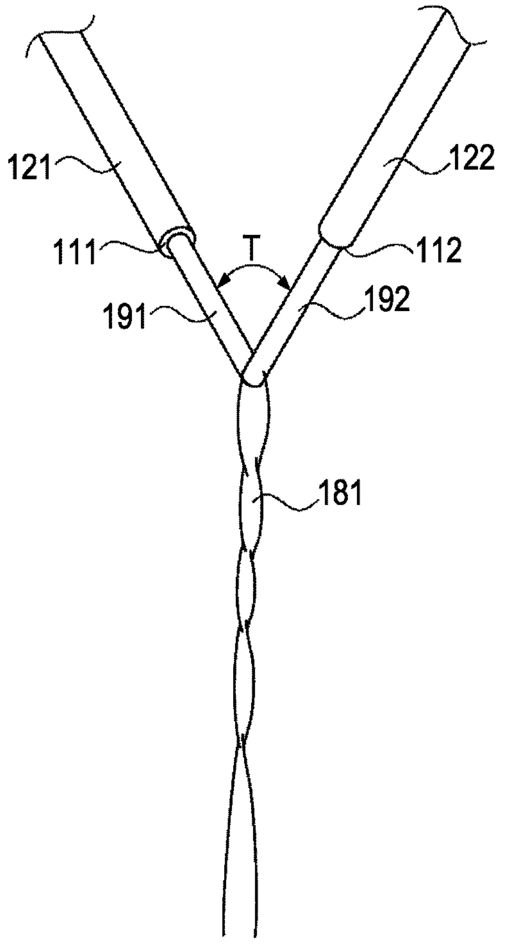
FIG. 1 is a schematic view illustrating a method according to an embodiment of the present invention.

FIG. 1 is a schematic view showing an embodiment of a liquid mixing device applicable to a method for manufacturing a dispersion according to one aspect of the present invention, and also showing a spiral flow formed by the device.

The embodiment of the liquid mixing device shown in FIG. 1 is a mixing device in which a first liquid (A) 191 and a second liquid (B) 192 are ejected from two openings 111 and 112 of two nozzles 121 and 122, respectively, and after the liquids are brought into contact with each other, a spiral flow is formed. In this figure, a case in which the traveling directions of the liquids are controlled to intersect each other in a free space is shown by way of example. That is, according to this example, after the liquids intersect (i.e., are brought into contact with) each other in a free space, the liquids are integrated with each other to form a spiral flow 181.

The intersection performed in a free space indicates that liquids ejected from nozzle openings are not brought into contact with materials, such as a housing and a wall during intersection therebetween, and instead are first brought into contact with each other in, for example, at least one of an air space, an open space, a reduced-pressure controlled space, and a space in which a gas atmosphere is controlled.

According to aspects of the present invention, when the liquid A and the liquid B are mixed together, a chemical reaction occurs, and hence a dispersion in which particles generated thereby is dispersed in a dispersion medium may be manufactured.

As chemical reactions according to embodiments of the invention, for example, there may be mentioned one or more of a coupling reaction, a hydrolysis reaction, an ion reaction, a radical reaction, a dehydration reaction, an addition reaction, a polycondensation reaction, an oxidation reaction, a reduction reaction, a neutralization reaction, and an enzyme reaction.

In the above list of chemical reactions according to embodiments of the invention, a reaction may also be included therein in which when a solution containing a component is mixed with another solution (such as in the case of a solvent), the solubility of the component in the mixed solution is decreased, and the component is precipitated.

In addition, in the above reactions according to embodiments of the invention, a plurality of reactions which occur in combination may also be included.

Embodiments of a method for manufacturing a dispersion according to aspects of the present invention include a method in which the liquids A and B are ejected from the nozzle openings 111 and 112, respectively, and are brought into contact with each other on extended lines of the traveling directions of the liquids to form the spiral flow 181.

An angle T at which the liquids A and B are brought into contact with each other may be set to, for example, 150° or less.

However, the angle T may also be 120° or less, to improve the stability of the spiral flow 181, for example the angle T may be set between 50° and 10°.

According to aspects of the present invention, a spiral flow indicates a flow in which a plurality of liquids moves in an axial direction by circular movement around the shared axis while being intertwined with each other.

According to research carried out by the inventors, since the liquids A and B are ejected from the openings 111 and 112, respectively, before the two liquids are brought into contact with each other, the velocity of the liquid A at a central portion of the traveling axis is higher than that at a peripheral portion, which can be influenced by a nozzle wall. As for the liquid B, the velocity at a central portion of the traveling axis is also higher, as described above.

In addition, since the spiral flow is formed after the liquids are brought into contact with each other, at the initial stage after the contact, the flow of the liquid A and the flow of the liquid B in a cross-sectional direction perpendicular to the traveling direction of the spiral flow rotates so that the liquid A and the liquid B rub against each other. That is, since the two liquids both rotate, for example, in a clock-wise direction, the liquids rotate in directions at a liquid-contact surface so that the rotations thereof are counteracted by each other.

Subsequently, a flow of the liquid A or B, whichever is dominant, draws the other flow, so that the two types of liquids flow in an integrated manner while forming a spiral-shaped interface. Since the spiral-shaped interface is formed, the contact surface area between the liquids A and B is larger than that obtained when the liquids are brought into contact with each other at a flat plane interface.

As a result, the reaction between the liquids A and B occurs in a wider area, and hence the reaction may be completed within a shorter period of time.

In addition, the spiral-shaped interface disappears as the time further passes (i.e., as the liquids flow), so that a state in which the liquids are regarded as an approximately uniform mixture (composition or dispersion) can be obtained.

For the reasons described above, according to aspects of the present invention, it is possible to manufacture a dispersion that is excellent in uniform particle size. In addition, since the spiral flow 181 is formed, the flow fluxes of the liquids A and B can be suppressed from spreading, and as a result, the effect of being able to relatively easily recover the dispersion can be obtained.

Next, a method for generating a spiral flow according to an embodiment of the present invention will be described.

FIGS. 2A to 2E are schematic views each illustrating generation of a spiral flow according to an embodiment of the invention, and are cross-sectional views of liquids each perpendicular to a liquid-contact surface between the liquids A and B, and perpendicular to a traveling direction of the integrated liquid.

According to aspects of the present invention, since the liquids are brought into contact with each other while the centers of the axes of the liquids thus ejected in the traveling directions deviate from each other, the spiral flow is formed. In this case, the centers of the axes of the liquids in the traveling directions are represented by reference numerals 107*a* and 107*b*.

Hereinafter, the case in which the liquids are brought into contact with each other while the centers of the axes of the two liquids deviate from each other will be described in more detail.

In FIGS. 2A through 2E, reference numeral 150 indicates the liquid-contact surface, reference numeral 191 indicates a cross-section of the liquid A, reference numeral 107*a* indicates a gravity center Ga of the liquid A, reference numeral 192 indicates a cross-section of the liquid B, and reference numeral 107*b* indicates a gravity center Gb of the liquid B. In addition, reference numeral 108 indicates the normal line (passing through the gravity center of one of the liquids) to the liquid-contact surface 150 (and normal, i.e. perpendicular, to the liquid-contact surface).

In FIGS. 2A to 2E, the gravity center 107*a* of the liquid A and the gravity center 107*b* of the liquid B deviate from each other with respect to the identical normal line 108.

That is, according to one aspect of the present invention, in order to form the spiral flow, it may be effective that the gravity centers of two liquids in a cross-section perpendicular to the liquid-contact surface between the two liquids, and perpendicular to the traveling direction of the integrated liquid, are disposed at positions so as to deviate from each other with respect to the identical normal line to the liquid-contact surface.

Figure 2A:
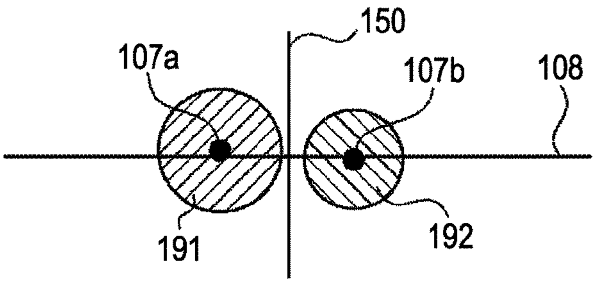
FIGS. 2A to 2E are schematic views each illustrating one example of a method for generating a spiral flow according to an embodiment of the invention.
Figure 2B:
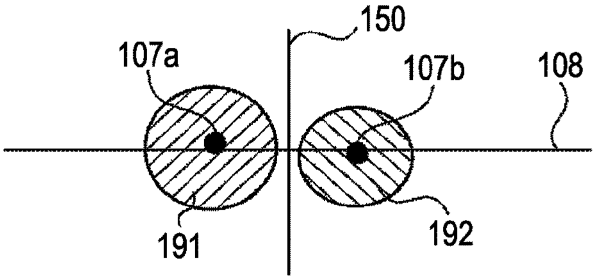

FIG. 2A shows the case in which the two liquids 191 and 192 have approximately circular cross-sections, although with different diameters, and FIG. 2B shows the case in which the two liquids each have an oval cross-section.

Figure 2C:
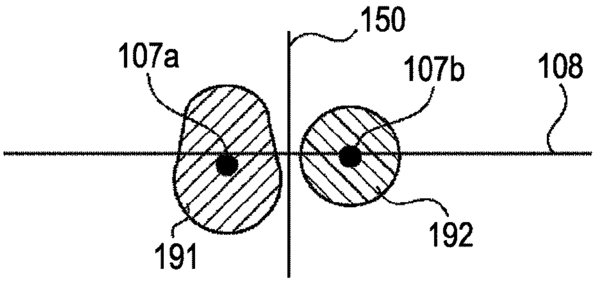
Figure 2D:
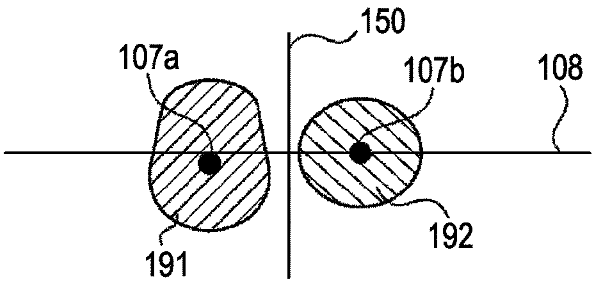
Figure 2E:
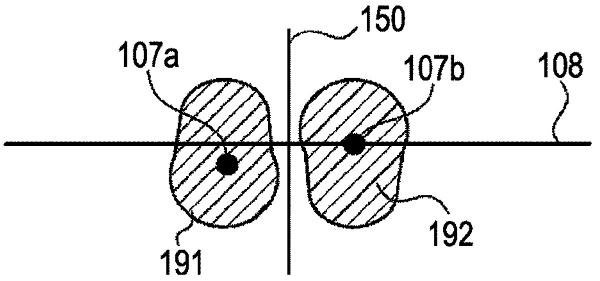

FIG. 2C shows the case in which the liquid 191 has a snowman-shaped (i.e., gourd-shaped) cross-section, FIG. 2D shows the case in which the liquid 191 has a daruma doll-shaped cross-section, and FIG. 2E shows the case in which the two liquids each have a snowman-shaped (i.e., gourd-shaped) cross-section.

The positional relationship between the gravity centers of the two liquids each shown in FIGS. 2A to 2E can be measured as described below.

Figure 3:
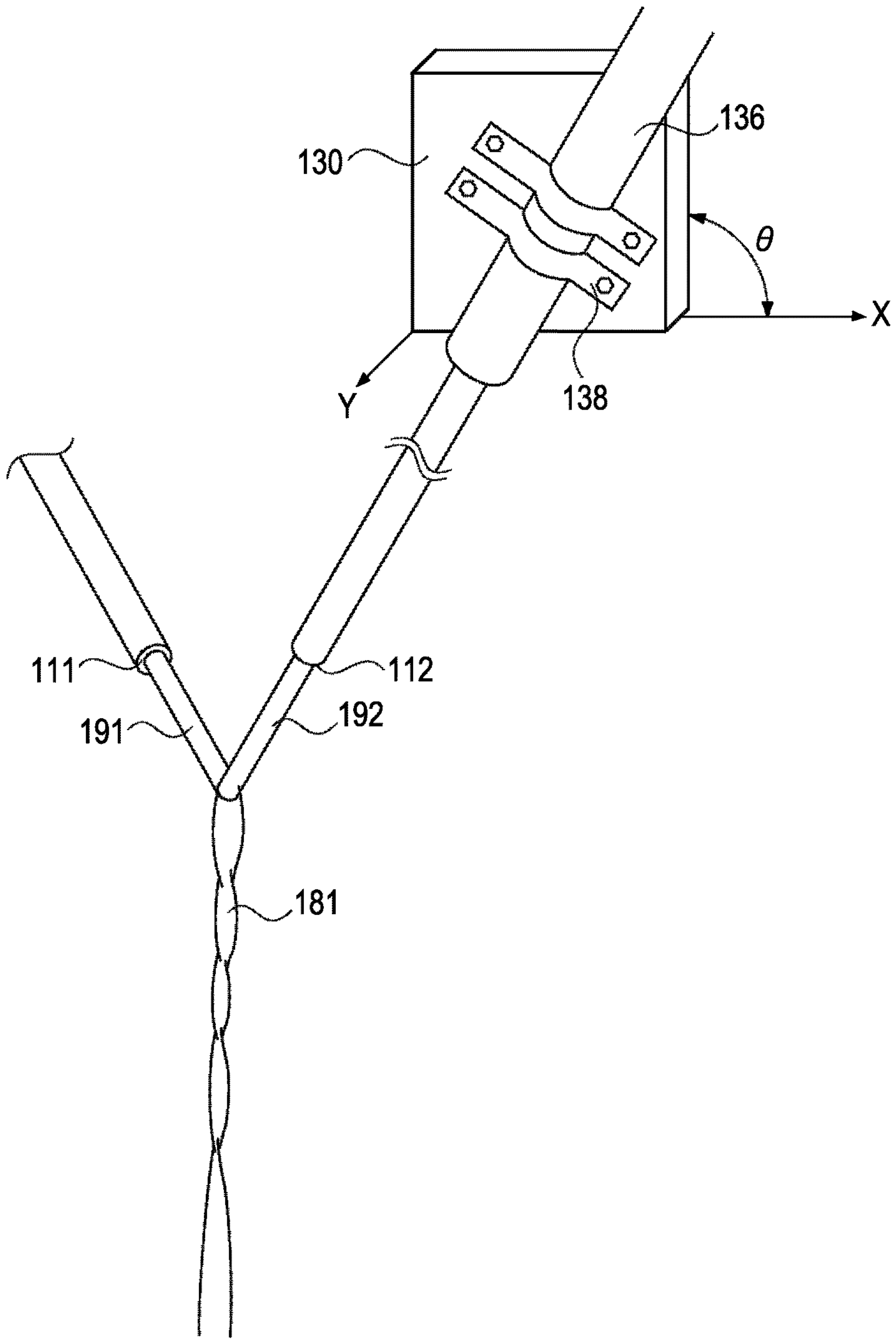
FIG. 3 is a schematic view showing one example of a mixing device in which two liquids are brought into contact with each other to form a spiral flow according to an embodiment of the invention.

As shown in the embodiment of FIG. 3, a nozzle having an opening 112 which ejects the liquid 192 is fixed to an XYθ stage 130 using a nozzle supporting member 136 and a nozzle fixing member 138.

Figure 4:
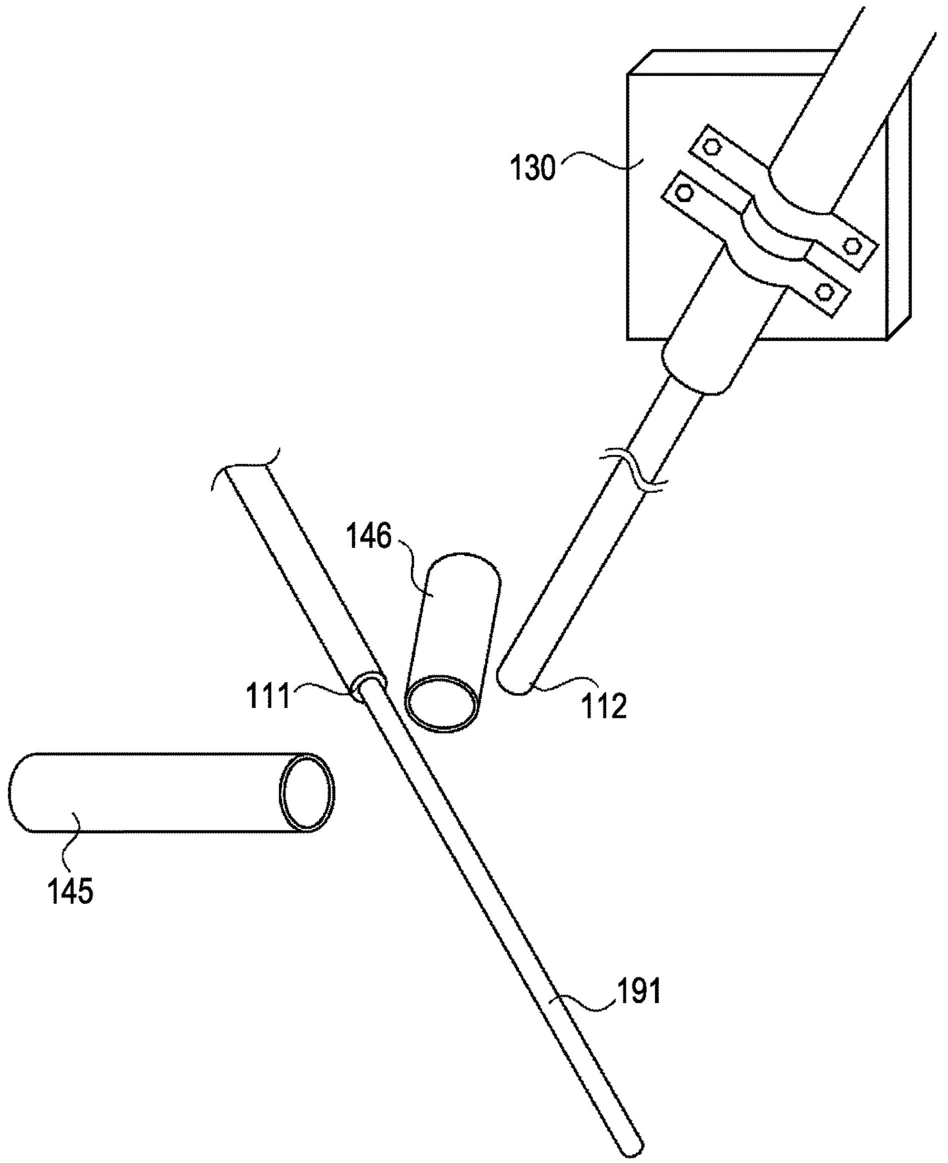
FIG. 4 is a schematic view showing one example of a mixing device in which two liquids are brought into contact with each other to form a spiral flow according to an embodiment of the invention.
Figure 5:
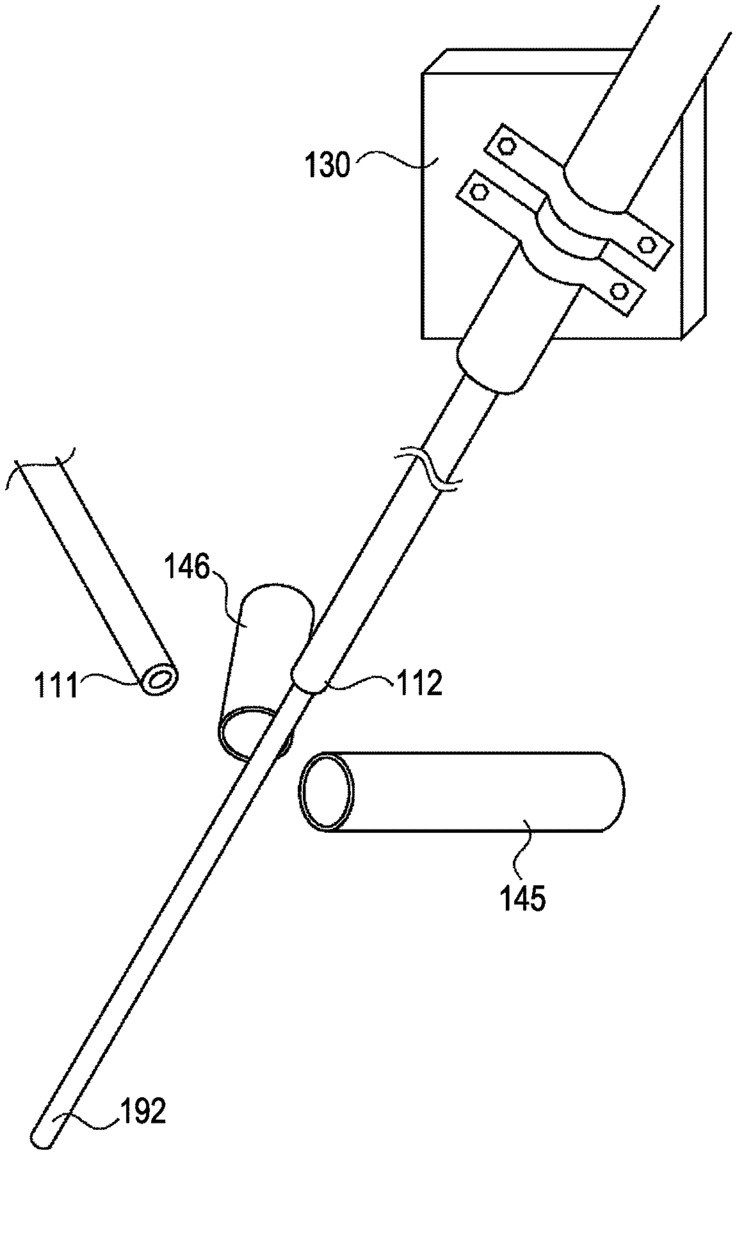
FIG. 5 is a schematic view showing one example of a mixing device in which two liquids are brought into contact with each other to form a spiral flow according to an embodiment of the invention.

As shown in the embodiment of FIG. 4, when a knob of the XYθ stage 130 is controlled, only the liquid 191 is ejected from the opening 111, and the gravity center can be calculated using cameras 145 and 146. Next, as shown in the embodiment of FIG. 5, only the other liquid 192 is ejected, and the gravity center may be calculated in a manner similar to that described above.

In addition, since the surface tension and viscosity of liquids may also be factors in forming a stable spiral flow, for example, the angle at which the two liquids are brought into contact with each other and the ejection pressures thereof may be adjusted, for example in accordance with liquids to be handled.

With reference to FIGS. 1 to 5, an embodiment of a method for manufacturing a dispersion has been described in which two types of liquids are ejected from two nozzles; however, instead of increasing the size of a reaction chamber, the production volume may also be increased by increasing the number of nozzles, so that mass production can also be realized.

Figure 7:
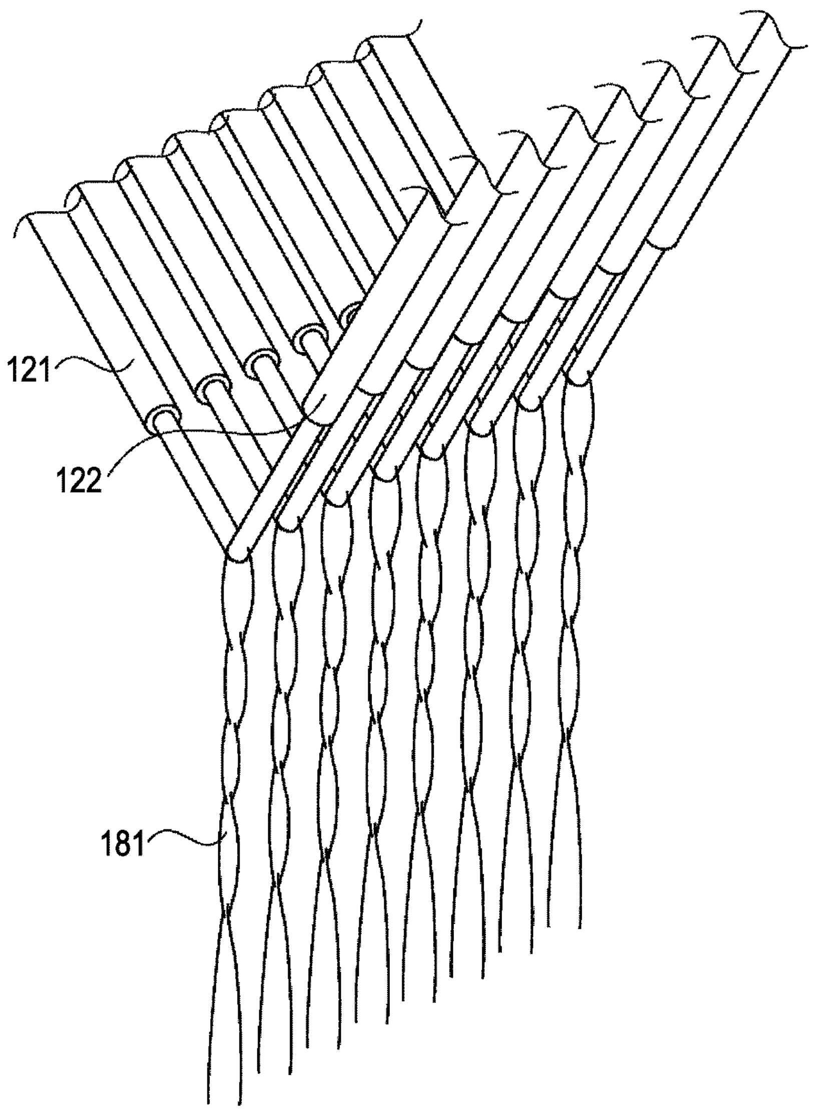
FIG. 7 is a schematic view showing one example of a device in which a plurality of nozzle pairs is integrally disposed according to an embodiment of the invention, each nozzle pair forming a spiral flow by bringing two liquids into contact with each other.

A device shown in the embodiment of FIG. 7 is a device in which a plurality of nozzle pairs are integrally disposed, each nozzle pair having the nozzle 121 ejecting the first liquid A and the nozzle 122 ejecting the second liquid B. By this device, a reaction can also be performed in each pair by generating the spiral flow 181.

Heretofore, the method in which two types of liquids are used has been described; however, three or more types of liquid may also be used.

Figure 8:
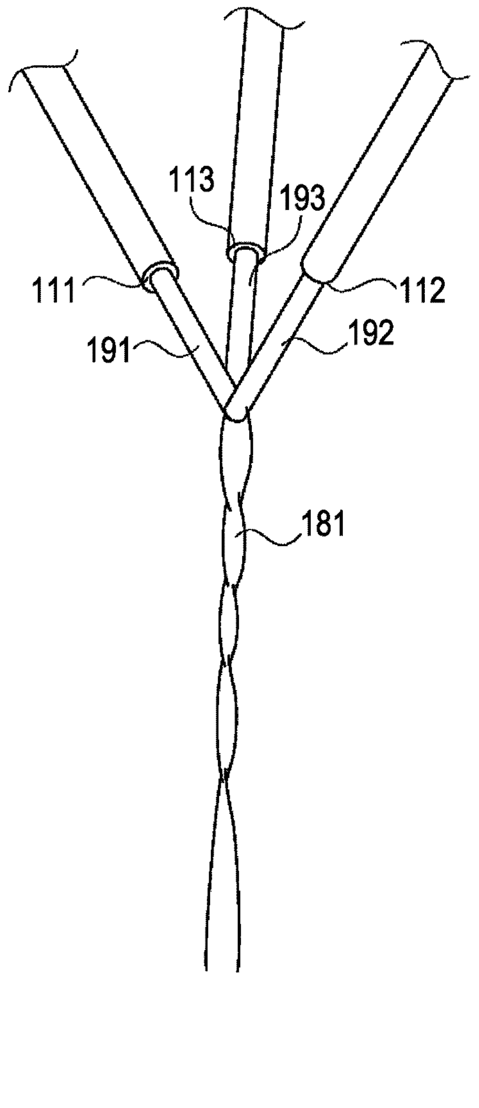
FIG. 8 is a schematic view showing one example of a mixing device according to an embodiment of the invention in which three liquids are brought into contact with each other to form a spiral flow.

A device shown in the embodiment of FIG. 8 is a device to form the spiral flow 181 using three types of liquids. In this device, in addition to the first liquid (A) 191 and the second liquid (B) 192, a third liquid (C) 193 is ejected from a third ejection opening 113 to form the spiral flow 181. As shown in FIG. 8, three or more nozzles might optionally be used as an example of the embodiment according to the present invention.

In the case of this device, although all the three liquids may be different from each other, the liquids may also be appropriately changed in accordance with a predetermined dispersion, and for example, the same liquid may be used for two of the three liquids, or the concentration of the liquid may be changed while the components of the liquid are not changed.

Next, besides the nozzle portions ejecting liquids, an apparatus for manufacturing a dispersion according to an embodiment of the present invention will be described as a system example.

Figure 6:
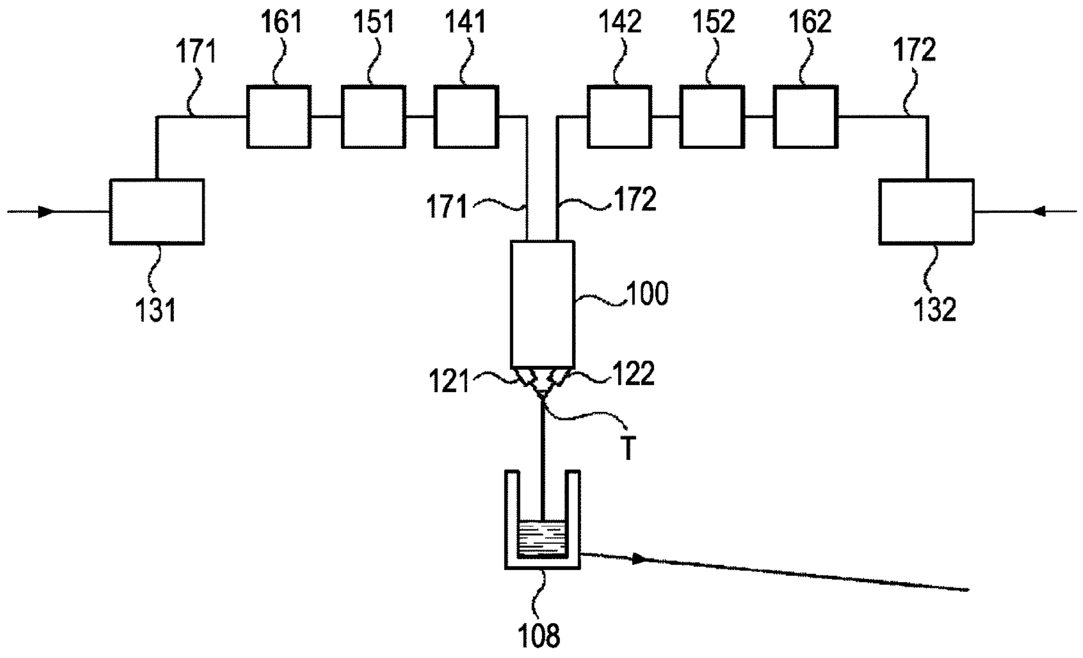
FIG. 6 is a schematic view showing one system example of a device for manufacturing a dispersion according to an embodiment of the invention.

FIG. 6 is a schematic view showing one system example according to an embodiment of the invention.

In the embodiment as shown in FIG. 6, reference numeral 100 indicates a mixing device including the nozzles 121 and 122. Liquids ejected from the nozzles 121 and 122 are brought into contact with each other for mixing and are then recovered by a mixed liquid recovering unit 108.

In FIG. 6, reference numerals 131 and 132 each indicate a liquid supply unit, and liquids are supplied to the liquid supply units 131 and 132 from liquid storage tanks. As the liquid supply units 131 and 132, a commercially available syringe pump, plunger pump, diaphragm pump, electromagnetic pump, or the like may be used.

Monitoring units 141 and 142, control units 151 and 152, and temperature control units 161 and 162 are connected between the mixing device 100 and the liquid supply units 131 and 132 through pipes 171 and 172, respectively.

The monitoring units 141 and 142 each comprise at least one of a flowmeter, a pressure gauge, and the like, and the control units 151 and 152 each comprise at least one of a valve, a bulb, and the like. The temperature control units 161 and 162 each may comprise at least one of a heater, cooler, and the like.

In order to connect the units described above, pipes 171 and 172 may be used, which are each formed of a tube or the like having resistance against the liquid to be transported. The individual units disposed between the liquid mixing device 100 and the liquid supply units 131 and 132 may be provided as shown, and optionally, all of the units may not always be provided in some cases.

Transportation of the liquids ejected from the nozzles 121 and 122 to the mixed liquid recovery unit 108 may be performed using the flow of the liquid generated by its own gravity, or by using a pressure generated by, for example, a pump.

As the liquid mixing device 100 shown in the embodiment of FIG. 6, one or more of the devices described, for example, with reference to FIGS. 1, 3, and 8, may be used. The liquid mixing device 100 may be formed from a small chemical device used to mix liquids or to perform a reaction therebetween.

The shape of a nozzle opening which forms an ejection port for ejecting a liquid may be, for example, a circle, an oval, a polygonal shape, such as a regular tetragon, an axial symmetric shape, such as a rectangle, or a non-axial symmetric shape integrally formed from different shapes.

Immediately after being ejected the liquid has a shape similar to the opening shape; however, the cross-sectional shape gradually changes to a circle or an oval due to the surface tension of the liquid.

The shapes of the nozzle openings ejecting the liquids A and B may be the same or may be different from each other. In addition, the nozzle opening areas for the two types of liquids may be the same or may be different from each other.

As materials used for the nozzle openings applicable to the present invention, for example, at least one of metal, glass, silicon, Teflon® (registered trade name), ceramic, and plastic may be provided.

For example, to provide one or more of heat resistance, pressure resistance, and solvent resistance, one or more of metal, glass, silicon, Teflon® (registered trade name), and ceramic may be used; in one version, a metal material may be used.

As the metal material, for example, at least one of stainless steel, Hastelloy (Ni—Fe alloy) nickel, gold, platinum, and tantalum may be provided.

In addition, in order to obtain corrosion resistance of the nozzle and/or a predetermined surface energy, a nozzle having a surface processed by lining may also be used.

The method for manufacturing a dispersion according to aspects of the present invention includes an embodiment in which the liquids A and B are brought into contact with each other in a free space to form a spiral flow. By the method described above, since the liquids A and B form a spiral flow and are mixed together at the same timing, the uniformity of reaction and mixing is improved, and hence the diameters of particles to be formed are more likely to coincide with each other.

In addition, when the opening areas of the nozzle openings are decreased, since the absolute volumes of the liquids to be supplied are decreased, rapid mixing and reaction occur, and as a result, the diameters of particles are more likely to decrease.

The reason the diameters of particles are more likely to decrease when rapid mixing is performed is that, since a great number of nuclei are generated by instantaneous mixing, and a great number of particles are generated thereby, particle formation occurs relatively smoothly, and particles having a relatively small primary particle diameter are formed.

The opening area of the opening per one nozzle supplying the liquid may be 7 $mm^2$ or less in view of mixing efficiency, for example such as 0.8 $mm^2$ or less, and even 0.2 $mm^2$ or less, such as 0.008 $mm^2$ or less.

In addition, when the ejection from the nozzle opening and the viscosity of the liquid are taken into consideration, the above opening area may be 0.00008 $mm^2$ or more, such as 0.002 $mm^2$ or more.

As the opening area of the nozzle opening is decreased, the liquid width (i.e., liquid diameter) of the liquid to be supplied decreases, and as a result, the mixing may be more efficiently performed.

On the other hand, as the opening area of the opening is increased, the liquid width also increases, and as a result, the mixing efficiency may be degraded.

However, when a liquid having a relatively high viscosity is used, and when an opening having a smaller opening area is used, ejection may not be adequately performed in some cases due to a large pressure loss; hence, it may be effective to select the opening area of the opening in accordance with a liquid to be used.

According to aspects of the present invention, when the liquid A and the liquid B are not brought into contact with each other in a structurally defined flow path (e.g., a flow path defined by walls) but instead in a free space, the flow path does not become clogged with particles formed by the contact between the liquids.

In addition, as the mixing is not mixing (e.g., reaction) in a flow path caused by self-dispersion during a laminar flow process, inhibition of mixing caused by particles to be formed is suppressed, and hence a particle generation concentration can be increased.

Accordingly, the amount of a solvent or the like to be used can be decreased, and the times for subsequent condensation and purification steps can also be decreased; hence, the cost of the dispersion manufacturing process can be decreased.

In a case where a pigment can be dissolved only at a low concentration, in order to generate an organic metal complex, the amount of a solvent may be increased, and condensation may be performed by ultrafiltration or reduced-pressure distillation; however, certain inconveniences, such as the cost generated for waste liquid treatment and/or load placed on the environment, may occur.

In the case described above, embodiments of the present invention may be particularly effective.

As examples of particle dispersions manufactured by the method for manufacturing a dispersion according to aspects of the present invention, for example, one or more of inorganic particles, organic particles, emulsion or polymer particles, and composite particles thereof may be mentioned.

In addition, the diameter of particles may be determined from the order of nanometers to millimeters in accordance with material properties and applications.

The emulsion or polymer particles may be used for manufacturing, for example, a general latex.

The inorganic particles may be used for manufacturing, for example, general metal particles, and in a hydrolysis polycondensation reaction, for example, a combination between the liquid A as an inorganic alkoxide and the liquid B as a solution containing water may be mentioned by way of example.

In this case, the reaction product may be an inorganic-alkoxide hydrolysis polycondensate.

Hydrolysis of an inorganic alkoxide and a subsequent polycondensation reaction are reactions collectively referred to as a sol-gel method. This is a method in which an inorganic alkoxide is processed in a solution by a hydrolysis polycondensation reaction to form a sol in which fine particles of one or more of an inorganic oxide and an inorganic hydroxide is dissolved, and the reaction is further advanced to form a gel.

According to one aspect, in order to obtain a dispersion of an inorganic-alkoxide hydrolysis polycondensate, a dispersing agent may be added to at least one of the liquids A and B.

However, when an inorganic-alkoxide hydrolysis polycondensate as a reaction product has sufficient dispersion properties to disperse in a dispersion medium, a dispersing agent may not necessarily be contained in one of the liquids A and B, or in both of them.

As the inorganic alkoxide, for example, a compound represented by the following formula (I) may be mentioned.

$$R^1_nM(OR^2)_{m-n} \quad (I)$$

In the formula (I), M represents an atom selected from Si, Al, Ti, Zr, Ca, Fe, V, Sn, Li, and Be, $R^2$ represents an alkyl group, $R^1$ represents an alkyl group or an alkyl group having a functional group, m represents the atomic valence of M, and n represents an integer from 1 to m.

Among the compounds represented by the formula (I), a compound may be provided in which n=0 is satisfied, that is, in which only at least one alkoxy group is bonded to M.

When M represents Ti, since the atomic valence m of Ti is 4, the alkoxide is represented by $Ti(OR^2)_4$.

As the titanium alkoxide described above, for example, at least one of $Ti(OCH_3)_4$, $Ti(OC_2H_5)_4$, $Ti(OC_3H_7)_4$, $Ti(OCH(CH_3)_2)_4$, and $Ti(OC_4H\ )_4$ may be provided; however, the titanium alkoxide is not limited thereto.

When M represents Si, since the atomic valence m of Si is 4, the alkoxide is represented by $Si(OR^2)_4$.

As the alkoxysilane described above, for example, at least one of $Si(OCH_3)_4$, $Si(OC_2H_5)_4$, $H_2NCH_2Si(OCH_3)_3$, $H_2NCH_2SiCH_3(OCH_3)_2$, $H_2NCH_2CH_2Si(OCH_3)_3$, $H_2NCH_2CH_2CH_2Si(OCH_2CH_3)_3$, $HN(CH_3)CH_2Si(OCH_3)_3$, $HN(CH_3)CH_2CH_2Si(OCH_3)_3$, $HN(CH_3)CH_2CH_2CH_2Si(OCH_3)_3$, $HN(CH_3)CH_2CH_2CH_2Si(OCH_2CH_3)_3$, $N(CH_3)_2CH_2Si(OCH_3)_3$, $N(CH_3)_2CH_2CH_2Si(OCH_3)_3$, $N(CH_3)_2CH_2CH_2CH_2Si(OCH_2CH_3)_3$, $Cl^-N^+(CH_3)_3CH_2Si(OCH_3)_3$, $Cl^-N^+(CH_3)_3CH_2CH_2Si(OCH_3)_3$, $Cl^-N^+(CH_3)_3CH_2CH_2CH_2Si(OCH_3)_3$, $Cl^-N^+(CH_3)_3CH_2CH_2CH_2Si(OCH_3)_3$, $Cl^-N^+(CH_3)_3CH_2CH_2CH_2Si(OCH_2CH_3)_3$, $C_6H_5NCH_2CH_2CH_2Si(OCH_3)_3$, $NH_2CONHCH_2CH_2CH_2Si(OCH_3)_3$, and $NH_2CH_2CH_2NHCH_2CH_2CH_2Si(OCH_3)_3$ may be provided.

When M represents Al, since the atomic valence m of Al is 3, the alkoxide is represented by $Al(OR^2)_3$.

As the aluminum alkoxide described above, for example, at least one of $Al(OCH_3)_3$, $Al(OC_2H_5)_3$, $Al(OC_3H_7)_3$, $Al(OCH(CH_3)_2)_3$, and $Al(OC_4H_9)_3$ may be provided.

As other inorganic alkoxides, for example, at least one of $Ca(OC_2H_5)_2$, $Fe(OC_2H_5)_3$, $V(OCH(CH_3)_2)_4$, $Sn(OC(CH_3)_3)_4$, $Li(OC_2H_5)$, and $Be(OC_3H_7)_2$ may be provided.

In addition, instead of the alkoxide, an inorganic halide in which $OR^2$ represents a halogen atom may also be used.

According to aspects of the present invention, the reaction is not limited to those described above, and the method for manufacturing a dispersion according to embodiments of the present invention may also be used for manufacturing other dispersions, including metal nanoparticles and the like.

As the organic particles, coloring materials, such as pigments or dyes, may be provided.

As usable dyes, for example, there may be provided one or more of water-soluble dyes, such as a direct dye, an acid dye, a basic dye, a reactive dye, and a food colorant; lipid-soluble dyes; and water-insoluble colorants, such as a disperse dye.

For example, one or more of C. I. Solvent Blue, -33, -38, -42, -45, -53, -65, -67, -70, -104, -114, -115, and -135; C. I. Solvent Red, -25, -31, -86, -92, -97, -118, -132, -160, -186, -187, and -219; C. I. Solvent Yellow, -1, -49, -62, -74, -79, -82, -83, -89, -90, -120, -121, -151, -153 and -154, may be provided.

As the water-soluble dyes, for example, one or more of C. I. Direct Black, -17, -19, -22, -32, -38, -51, -62, -71, -108, -146, and -154; C. I. Direct Yellow, -12, -24, -26, -44, -86, -87, -98, -100, -130, and -142; C. I. Direct Red, -1, -4, -13, -17, -23, -28, -31, -62, -79, -81, -83, -89, -227, -240, -242, and -243; C. I. Direct Blue, -6, -22, -25, -71, -78, -86, -90, -106, and -199; C. I. Direct Orange, -34, -39, -44, -46, and -60; C. I. Direct Violet, -47 and -48; C. I. Direct Brown, -109; C. I. Direct Green, direct dyes such as -59; C. I. Acid Black, -2, -7, -24, -26, -31, -52, -63, -112, -118, -168, -172, and -208; C. I. Acid Yellow, -11, -17, -23, -25, -29, -42, -49, -61, and -71; C. I. Acid Red, -1, -6, -8, -32, -37, -51, -52, -80, -85, -87, -92, -94, -115, -180, -254, -256, -289, -315, and -317; C. I. Acid Blue, -9, -22, -40, -59, -93, -102, -104, -113, -117, -120, -167, -229, -234, and -254; C. I. Acid Orange, -7, -19; C. I. Acid Violet, acid dyes such as -49; C. I. Reactive Black, -1, -5, -8, -13, -14, -23, -31, -34, and -39; C. I. Reactive Yellow, -2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, and -163; C. I. Reactive Red, -3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, and -221; C. I. Reactive Blue, -2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, and -217; C. I. Reactive Orange, -5, -7, -11, -12, -13, -15, -16, -35, -45, -46, -56, -62, -70, -72, -74, -82, -84, -87, -91, -92, -93, -95, -97, and -99; C. I. Reactive Violet, -1, -4, -5, -6, -22, -24, -33, -36, and -38; C. I. Reactive Green, -5, -8, -12, -15, -19, and -23; C. I. Reactive Brown, reactive dyes, such as -2, -7, -8, -9, -11, -16, -17, -18, -21, -24, -26, -31, -32, and -33; C. I. Basic Black, -2; C. I. Basic Red, -1, -2, -9, -12, -13, -14, and -27; C. I. Basic Blue, -1, -3, -5, -7, -9, -24, -25, -26, -28, and -29; C. I. Basic Violet, -7, -14, and -27; and C. I. Food Black, -1 and -2, may be provided.

As the pigments, one or more of an inorganic pigment, an organic pigment, and a composite pigment thereof may be provided.

As the inorganic pigment, one or more of the above inorganic particles may be provided, and as the organic pigment, the following may be provided by way of example.

As cyan pigments, for example, one or more of C. I. Pigment Blue-1, C. I. Pigment Blue-2, C. I. Pigment Blue-3, C. I. Pigment Blue-15, C. I. Pigment Blue-15:2, C. I. Pigment Blue-15:3, C. I. Pigment Blue-15:4, C. I. Pigment Blue-16, C. I. Pigment Blue-22, and C. I. Pigment Blue-60 may be provided.

As magenta pigments, for example, one or more of C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, C. I. Pigment Red-202, and C. I. Pigment Red-207, may be provided.

As yellow pigments, for example, one or more of C. I. Pigment Yellow-12, C. I. Pigment Yellow-13, C. I. Pigment Yellow-14, C. I. Pigment Yellow-16, C. I. Pigment Yellow-17, C. I. Pigment Yellow-74, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151 and C. I. Pigment Yellow-154, may be provided.

According to one embodiment of a method according to the present invention, the liquid A may be a solution in which a pigment is dissolved in an acidic or an alkaline solvent, or in a mixed solvent containing an organic solvent and an acidic or an alkaline solvent, and the liquid B may be a pigment precipitation medium (i.e., a poor solvent that decreases a pigment solubility).

In the case described above, the acid to be used may be selected from acids that are each capable of dissolving a pigment by itself or in a mixed solution with an organic solvent, and for example, there may be used one or more of an alkylsulfonic acid, such as methanesulfonic acid, ethanesulfonic acid, propanesulfonic acid, or butanesulfonic acid, a halogenated alkylsulfonic acid obtained by halogenation of the above compound, p-toluenesulfonic acid, 2-naphthalenesulfonic acid, p-chlorobenezen sulfonic acid, p-xylene-2-sulfonic acid, trifluoroacetic acid, trifluoromethanesulfonic acid, sulfuric acid, hydrochloric acid, acetic acid, phosphoric acid, and polyphosphoric acid.

In addition, the acids mentioned above may be used alone or in combination.

For dissolution, if the acids mentioned above are solid at room temperature, heating may be performed to its melting point or more for fusion. In addition, the pigment may be dissolved at room temperature or by heating.

The alkali may be selected from compounds which can dissolve a pigment by itself, or in a mixed solution with an organic solvent.

For example, hydroxides of alkali metals, alkoxides thereof, hydroxides of alkali earth metals, alkoxides thereof, and organic strong bases may be used, because of their high ability in dissolving an organic pigment.

In particular, for example, one or more of lithium hydroxide, sodium hydroxide, potassium hydroxide, calcium hydroxide, potassium-tert-butoxide, potassium methoxide, potassium ethoxide, sodium methoxide, sodium ethoxide, a quaternary ammonium compound such as tetrabutylammonium hydroxide, 1,8-diazabicyclo[5,4,0]-7-undecene, 1,8-diazabicyclo[4,3,0]-7-nonene, and guanidine may be provided.

In addition, the alkalis mentioned above may be used alone or in combination.

The organic solvent (i.e., dispersion medium) may be selected from compounds which are capable of dissolving a pigment either by itself or by a mixed solution with an acid or an alkali.

For example, one or more of dimethylformamide, dimethyl sulfoxide, dimethylimidazolidinone, sulfolane, N-methylpyrrolidone, acetonitrile, acetone, dioxane, tetramethylurea, hexamethyl phosphoramide, hexamethyl phosphortriamide, pyridine, propionitrile, butanone, cyclohexanone, tetrahydrofuran, tetrahydropyrane, ethylene glycol diacetate, γ-butyrolactone, and acetic acid may be provided, and may be used in combination.

The precipitation medium (i.e., dispersion medium) may be selected from media which are capable of decreasing the solubility of a dissolved pigment.

For example, one or more of water, an aqueous acidic solution, an aqueous alkaline solution, an alcohol, an aqueous organic solvent, a nonaqueous organic solvent, and a mixture thereof, may be provided.

According to one embodiment, when a pigment solution, which is the liquid A, and a precipitation medium, which is the liquid B, are brought into contact with each other in the presence of a dispersing agent, since dispersion properties can be imparted to the pigment by the dispersing agent before the pigment grows into large and coarse particles due to its precipitation, a pigment dispersion having a relatively small particle diameter can be effectively obtained.

According to one embodiment of a method according to the present invention, a coupler solution may be used as the liquid A, and a diazonium salt solution may be used as the liquid B.

When the above solutions are used, an azo compound can be manufactured. As the azo compounds, for example, at least one of azo-based pigments, such as a known azo, bisazo, insoluble azo pigment, condensed azo pigment, azo lake, and chelate azo pigment, may be manufactured. As the pigment, a commercially available pigment may also be used. The commercially available pigments will be mentioned below by way of example.

That is, for example, there may be mentioned one or more of C. I. Pigment Yellow 74, 93, 94, 95, 120, 128, 151, 154, 166, 175, 180, and 181; C. I. Pigment Red 5, 31, 144, 146, 147, 150, 166, 176, 184, and 269; and C. I. Pigment Orange 31.

As the diazonium salt, for example, a diazonium salt derived from a compound having an aromatic amine or a heterocyclic amine structure may be used.

As the coupler, for example, at least one of a coupler including an aromatic compound having an aniline, a phenol or a naphthol structure, and a compound having an acetoacetoxy group, may be used.

According to one embodiment, when the coupler solution and the diazonium salt are brought into contact with each other in the presence of a dispersing agent, if the azo compound is in the form of particles, dispersion properties can be imparted to the azo compound by the dispersing agent before the azo compound grows into large and coarse particles due to its precipitation; hence, an azo-compound dispersion having a relatively small particle diameter can be effectively obtained.

When the reaction product is in the form of particles, a dispersing agent which suppresses the particles from growing into large and coarse particles caused by adsorption between the particles and which suppresses cohesion therebetween may be used. As the dispersing agent described above, for example, a surfactant may be used. As the surfactant, for example, at least one of an anionic, a nonionic, an amphoteric, and a cationic surfactant may be mentioned.

According to one aspect of the present invention, when a dispersing agent is contained in at least one of the liquids A and B, the liquid A and liquid B can be brought into contact with each other in the presence of the dispersing agent.

As the anionic surfactant usable in the present invention, for example, one or more of fatty acid salts, alkylsulfate salts, alkylarylsulfonic acid salts, alkyldiaryl ether disulfonic acid salts, dialkyl sulfosuccinic acid salts, alkylphosphoric acid salts, naphthalenesulfonic acid-formalin condensates, polyoxyethylene alkylphosphoric acid ester salts, and glycerol borate fatty acid esters, may be provided.

As the cationic surfactant, for example, one or more of alkylamine salts, quaternary ammonium salts, alkylpyridinium salts, and alkylimidazolium salts may be provided.

As the amphoteric surfactant, for example, one or more of alkylbetaines, alkylamine oxides, phosphatidylcholine, and amphiphilic block copolymers may be provided.

As the nonionic surfactant, for example, one or more of polyoxyethylene alkyl ethers, polyoxyethylene oxypropylene block copolymers, sorbitan fatty acid esters, glycerin fatty acid esters, polyoxyethylene fatty acid esters, and polyoxyethylene alkylamines may be provided.

Hereinafter, with reference to concrete examples, the present invention will be described in more detail.

EXAMPLES

Example 1

In this example, a 2,9-dimethyl quinacridone pigment was used.

Into an eggplant-type flask having a volume of 300 ml, 10 parts by weight of 2,9-dimethyl quinacridone was charged, and 80 parts by weight of methanesulfonic acid was further added at room temperature. This eggplant-type flask was placed in an oil bath heated to 80° C, and stirring was performed in an argon atmosphere for 10 minutes while heating was performed. As a result, a quinacridone pigment solution having a violet-blue color and containing 2,9-dimethyl quinacridone was prepared.

Next, a solution in which 6.86 parts by weight of polyoxyethylene cetyl ether functioning as a nonionic surfactant was dissolved in 30 parts by weight of acetonitrile was added to 50 ml of the quinacridone pigment solution to prepare the liquid A. As the liquid B, an aqueous polyoxyethylene lauryl ether solution at a concentration of 0.1 percent by weight was prepared.

Figure 9A:
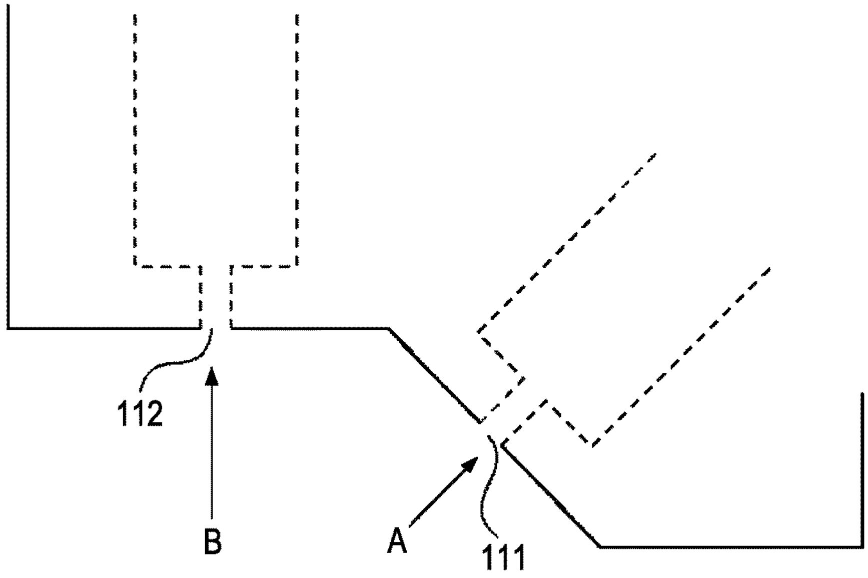
FIGS. 9A and 9B are schematic views each showing one example of a mixing device according to an embodiment of the invention in which two liquids are brought into contact with each other to form a spiral flow.
Figure 9B:
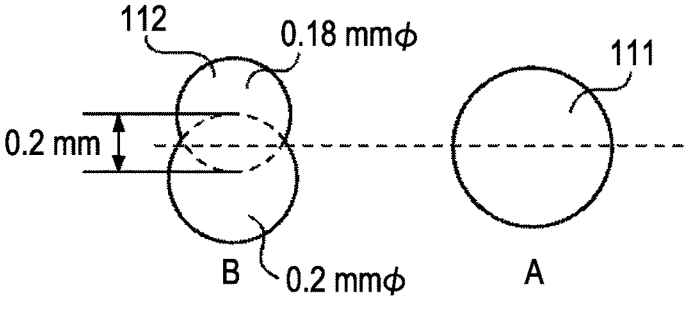

In this example, for the contact and the mixing between the liquid A and the liquid B, a mixing device made of Teflon® (registered trade name) in which two nozzles were integrally provided as shown in FIG. 9A was used. FIG. 9*b* is a schematic view of nozzle openings when viewed along A and B directions shown in FIG. 9A.

A nozzle opening 111 ejecting the liquid A had a circular shape having a diameter of 0.25 mm. On the other hand, a nozzle opening 112 ejecting the liquid B had a shape in which circles having a diameter of 0.2 mm and a diameter of 0.18 mm were partly overlapped. The distance between the centers of the two openings having a diameter of 0.2 mm and a diameter of 0.18 mm was 0.2 mm. The angle at which the liquids A and B were brought into contact with each other was 45°. In this mixing device, it was designed in advance that the gravity center of the liquid A and that of the liquid B in their cross-sections were not located on the identical normal line to a liquid-contact surface between the two liquids.

The liquid A was supplied by a syringe pump at a flow rate of 5 ml/min, and the liquid B was supplied by a plunger pump at a flow rate of 8 ml/min. After the liquids A and B were brought into contact with each other, the two liquids were integrated together to form a spiral flow. As a result, particles of 2,9-dimethyl quinacridone were generated and dispersed instantaneously, so that a magenta-colored dispersion was obtained at a high concentration.

In addition, the generation of droplets was suppressed because of the formation of the spiral flow, and hence no recovery loss of the dispersion of 2,9-dimethyl quinacridone occurred.

The dispersion thus obtained was purified and condensed by ultrafiltration. Since the dispersion having a high concentration was obtained from the beginning, the purification and condensation could be performed in a relatively short period of time. When the average particle diameter of the pigment fine particles was measured using DLS-8000 (Otsuka Electronics Co., Ltd.), the dispersion thus obtained had very uniform particle diameters, and the average particle diameter and the standard deviation were 89 nm and 27 nm, respectively. Even when the quinacridone pigment thus obtained was left for 28 days, no precipitation occurred.

A dispersion in which the quinacridone pigment thus obtained was dispersed as a color pigment (C. I. Pigment Red-122) was used as a starting material of an inkjet recording ink.

When the above dispersion was filled as ink in an ink tank of BJ printer BJ F900 (manufactured by Canon Kabushiki Kaisha), clear characters could be printed on standard paper.

Example 2

Figure 10:
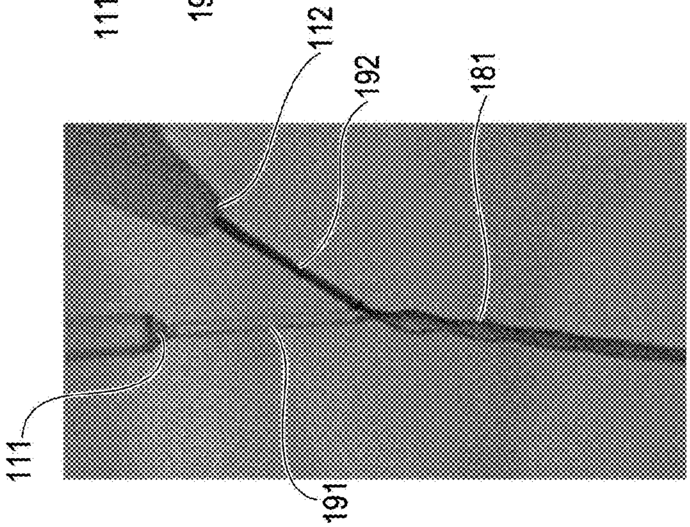
FIG. 10 is a photograph showing a state in which after two liquids are brought into contact with each other, an integrated flow forms a spiral flow.

In this example, a mixing device shown in FIG. 10 was used. In this device, the nozzle opening 111 ejecting the liquid A was made of Teflon® (registered trade name) and had an opening diameter of 300 μm. The nozzle opening 112 ejecting the liquid B was made of glass and had an opening diameter of 470 μm. The angle at which the liquids A and B were brought into contact with each other was 40°. The liquid A was prepared as described below.

Dimethyl sulfoxide in an amount of 100 parts by weight was added to 10 parts by weight of a quinacridone pigment, C. I. Pigment Red 122, to form a suspension.

Next, 40 parts by weight of lauryl sulfate sodium was added as a dispersing agent, and an aqueous potassium solution at a concentration of 25% was added until lauryl sulfate sodium was dissolved, so that the liquid A was prepared. As a liquid to be ejected from the other nozzle opening 112, ion-exchanged water was used.

The liquid A was supplied at a flow rate of 7 ml/min by a syringe pump used as a liquid supply unit, and the liquid B was supplied at a flow rate of 10 ml/min by a syringe pump.

The nozzles were placed so that the two types of liquids ejected from the nozzles intersect on extended lines of the respective traveling directions and so that a cross-sectional center (gravity center) of the liquid B and a cross-sectional center (gravity center) of the liquid A deviated with respect to the identical normal line to the liquid-contact surface. In this example, the placement of the nozzles was performed by a method similar to that described with reference to FIGS. 3 to 5.

As shown in FIG. 10, after the two types of liquids were brought into contact with each other, a spiral flow 181 was formed. After the two types of liquids were brought into contact with each other, a precipitation reaction and dispersing occurred instantaneously, so that a dispersion of the quinacridone pigment was obtained.

When the dispersion thus obtained was measured by a method similar to that of Example 1, the particles had an average particle diameter of 30 nm, and the particle distribution had a standard deviation of 12 nm.

Comparative Example 1

In this comparative example, a dispersion was manufactured under conditions similar to those of Example 2 except that the nozzles were disposed so that after the liquids A and B were brought into contact with each other, the spiral flow was not formed.

In particular, after the nozzles were placed so that the two types of liquids ejected from the nozzles were brought into contact with each other at the centers (i.e., gravity centers) of the liquids and on the extended lines of the respective traveling directions, the two liquids were brought into contact with each other and were allowed to react with each other.

Figure 11:
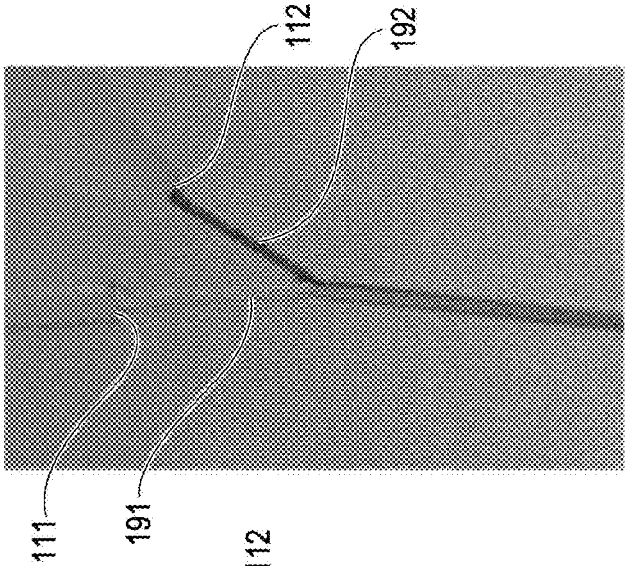
FIG. 11 is a photograph showing a state in which after two liquids are brought into contact with each other, an integrated flow does not form a spiral flow.

After the two types of liquids were brought into contact with each other, as shown in FIG. 11, the liquids flowed in an integrated manner without forming a spiral flow.

When the quinacridone pigment dispersion thus obtained was measured by a method similar to that of Example 1, the average particle diameter of the dispersion was 30 nm, and the standard deviation was 20 nm.

Comparative Example 2

In this comparative example, after the liquids A and B were brought into contact with each other, the liquids were recovered by a recovery unit while no spiral flow was formed. In particular, a liquid mixing device was used in which a nozzle opening ejecting the liquid A was made of Teflon® (registered trade name) and had an opening diameter of 400 μm, and a nozzle opening ejecting the liquid B was made of glass and had an opening diameter of 470 μm. The angle at which the liquids A and B were brought into contact with each other was 100°. The liquid A was prepared as described below.

Dimethyl sulfoxide in an amount of 100 parts by weight was added to 10 parts by weight of a quinacridone pigment, C. I. Pigment Red 122, to form a suspension.

Next, 40 parts by weight of lauryl sulfate sodium was added as a dispersing agent, and an aqueous sodium potassium solution at a concentration of 25% was added until lauryl sulfate sodium was dissolved, so that the liquid A was prepared.

As the liquid B, ion-exchanged water was used.

The liquid A was supplied at a flow rate of 18 ml/min by a syringe pump used as a liquid supply unit, and the liquid B was supplied at a flow rate of 20 ml/min by a syringe pump.

Figure 12:
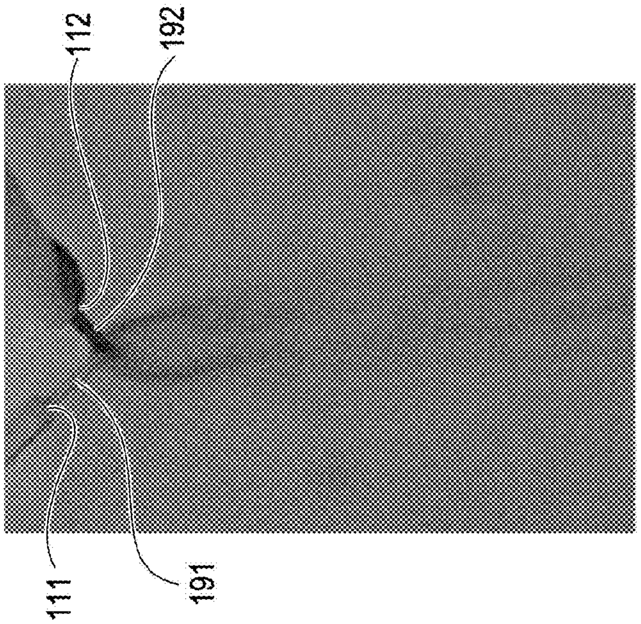
FIG. 12 is a photograph showing a state in which after two liquids are brought into contact with each other, an integrated flow does not form a spiral flow and spreads in the form of a fan.

The nozzles were placed so that the two types of liquids ejected from the nozzles were brought into contact with each other at the centers thereof and on the extended lines of the respective traveling directions. After the two liquids were brought into contact with each other, as shown in FIG. 12, the liquids were spread in the form of a fan, and droplets thereof were splashed around. After the liquids were brought into contact with each other, a re-precipitation reaction and dispersing occurred, and a dispersion of the quinacridone pigment was obtained. When the dispersion was recovered using a wide-mouth recovery container so as not to lose the droplets, the dispersion had a distribution in which two peaks were present at particle diameters of 40 to 120 nm.

Example 3

In this example, a mixing device (nozzles) similar to that of Example 2 was used.

In particular, a nozzle ejecting the liquid A was made of Teflon® (registered trade name) and had an opening diameter of 300 μm, and a nozzle ejecting the liquid B was made of glass and had an opening diameter of 470 μm.

The angle formed between the traveling directions of the liquids A and B was 50°.

As the liquid A, an aqueous 3,3'-dichlorobenzidene tetraazo solution was used, and as the liquid B, a solution in which polyoxyethylene lauryl ether was dissolved in an aqueous coupler solution at a concentration of 6% was used.

The liquid A was supplied at a flow rate of 7 ml/min by a syringe pump used as a liquid supply unit, and the liquid B was supplied at a flow rate of 10 ml/min by a syringe pump.

In a manner similar to that of Example 2, the nozzles were disposed, and the two liquids were allowed to flow, so that a spiral flow was formed.

By the contact between the liquid A and the liquid B, an azo coupling reaction occurred, and particles of Pigment Yellow 83 were generated.

In this step, the coexistent polyoxyethylene lauryl ether functioned as a dispersing agent, and as a result, a dispersion of Pigment Yellow 83 was obtained in which the sizes of particles were small and uniform. The average particle diameter of the dispersion thus obtained was 45 nm, and the particle diameters thereof were very uniform.

Example 4

In this example, a mixing device similar to that of Example 1 was used.

The contact and the reaction between two liquids were performed in a manner similar to that of Example 1 except that tetraisopropoxide titanate was used as the liquid A and an aqueous isopropyl alcohol solution at a concentration of approximately 60% was used as the liquid B.

As a result, a dispersion of titania was obtained as a hydrolysis polycondensate, the average particle diameter of the dispersion thus obtained was 30 nm, and the particle diameters thereof were very uniform.

Example 5

In this example, a dispersion of a lipid-soluble dye was manufactured.

A mixing device was used in which a nozzle opening ejecting the liquid A was made of Teflon® (registered trade name) and having an opening diameter of 170 μm and a nozzle opening ejecting the liquid B was made of Teflon® (registered trade name) and had an opening diameter of 250 μm. The angle at which the liquids A and B were brought into contact with each other was 35°.

The liquid A was a solution in which 7 parts by weight of lipid-soluble dye Oil Green 502 (manufactured by Orient Chemical Industries, Ltd.) and 7 parts by weight of polyoxyethylene cetyl ether were dissolved in 50 parts by weight of tetrahydrofuran. As the liquid B, ion-exchanged water was used.

The liquids A and B were supplied to the respective nozzles using plunger pumps each used as a liquid supply unit. The liquid A and the liquid B were supplied by the respective plunger pumps at flow rates of 6 ml/min and 7 ml/min, respectively.

After the nozzles were placed in a manner similar to that of Example 2, the liquids A and B were allowed to flow, so that a spiral flow was formed. Since the coexistent polyoxyethylene cetyl ether functioned as a dispersing agent, the lipid-soluble dye was dispersed, and the average particle diameter was 50 nm.

Example 6

In this example, the case in which three types of liquids were brought into contact with each other and were mixed together to obtain a dispersion, as shown in FIG. 8, will be described.

In this case, three nozzles were all made of Teflon® (registered trade name) tubes, a nozzle ejecting the liquid A had an opening diameter of 250 μm, a nozzle ejecting the liquid B had an opening diameter of 250 μm, and a nozzle ejecting the liquid C had an opening diameter of 500 μm.

The angle formed between the liquids was set to 50°.

2,9-dimethyl quinacridone was used as a magenta pigment. Into an eggplant-type flask having a volume of 300 ml, 10 parts by weight of 2,9-dimethyl quinacridone was charged, and 100 parts by weight of methanesulfonic acid was further added at room temperature.

This eggplant-type flask was placed in an oil bath heated to 80° C, and stirring was performed in an argon atmosphere for 10 minutes while heating was performed.

As a result, a quinacridone pigment solution having a violet-blue color and containing 2,9-dimethyl quinacridone was prepared.

Next, a solution in which 6.86 parts by weight of polyoxyethylene cetyl ether functioning as a nonionic surfactant was dissolved in 35 parts by weight of acetonitrile was added to 50 ml of the quinacridone pigment solution to prepare the liquid A.

As the liquid B, a Pigment Yellow 151 solution was used which was obtained by adding 50 parts by weight of a 6N aqueous sodium hydroxide solution to 10 parts by weight of Pigment Yellow 151 and 8 parts by weight of polyoxyethylene cetyl ether.

As the liquid C, an aqueous polyoxyethylene lauryl ether solution at a concentration of 0.1 percent by weight was used.

From the respective nozzles, the liquid A was ejected at a flow rate of 5 ml/min by a syringe pump, and the liquid B was ejected at a flow rate of 6 ml/min by a plunger pump. The liquid C was ejected at a flow rate of 12.5 ml/min by a plunger pump to the liquid-contact surface between the liquids A and B.

In this step, the nozzle ejecting the liquid C was shifted so as to form a spiral flow after the three types of liquids were brought into contact with each other. After the three types of liquids were brought into contact with each other, a re-precipitation reaction and dispersing occurred instantaneously, so that an orange-colored dispersion was obtained. The dispersion thus obtained was purified and condensed by ultrafiltration.

When the average particle diameter of the pigment fine particles was measured using DLS-8000 (Otsuka Electronics Co., Ltd.), it was 95 nm, and a dispersion in which the particle diameters were very uniform was obtained.

Accordingly, in the examples, after the nozzles are disposed so that the liquids ejected from the respective nozzles are brought into contact with each other and are then allowed to flow in an integrated manner while forming a spiral flow, the liquids are ejected from the nozzles. Accordingly, the examples show that flows of the liquids are stabilized, and hence the liquids can be more uniformly mixed together and can more uniformly react with each other. As a result, a pigment dispersion in which particles have a smaller diameter and a narrower particle distribution can be obtained.

In addition, the examples show that the liquid mixing device described therein is a suitable device for carrying out a method according to aspects of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-165078 filed Jun. 24, 2008 and No. 2008-278426 filed Oct. 29, 2008, which are hereby incorporated by reference herein in their entirety.

What is claimed is:

1. A method for manufacturing a dispersion which includes a dispersion medium and particles dispersed therein, the method comprising:

bringing at least two types of liquids into contact with each other to form a reaction product comprising the particles, wherein the liquids are ejected from respective nozzles to be brought into contact with each other and then to flow in an integrated manner while forming a spiral flow, and wherein the nozzles are disposed so that, in a cross-section which is perpendicular to a liquid-contact surface between one liquid A of the two types of liquids and another liquid B of the two types of liquids, and which is perpendicular to a traveling direction of an integrated liquid formed of the liquid A and the liquid B, a gravity center Ga of the liquid A and a gravity center Gb of the liquid B deviate from each other with respect to an identical normal line to the liquid-contact surface.

2. The method for manufacturing according to claim 1, wherein traveling directions of the ejected liquids intersect each other in a free space.

3. The method for manufacturing according to claim 2, wherein the nozzles are disposed so that the liquids are brought into contact with each other in a state in which centers of axes of the ejected liquids in the traveling directions deviate from each other.

4. The method for manufacturing according to claim 1, wherein the liquids which flow in an integrated manner while forming a a spiral-shaped interface therebetween.

5. The method for manufacturing according to claim 1, wherein one of the two types of liquids is a solution capable of dissolving a pigment, and the other liquid is a solution capable of decreasing the solubility of the pigment.

6. The method for manufacturing according to claim 1, wherein one of the two types of liquids is a solution comprising a coupler, and the other liquid is a solution comprising a diazonium salt.

7. The method for manufacturing according to claim 1, wherein at least one of the two types of liquids comprises a dispersing agent.

8. The method for manufacturing according to claim 1, wherein the dispersion is a starting material for an inkjet recording ink.

* * * * *